United States Patent
Tamesue et al.

(10) Patent No.: US 9,481,771 B2
(45) Date of Patent: Nov. 1, 2016

(54) METHOD FOR ADHERING HYDROGELS

(71) Applicants: RIKEN, Wako, Saitama (JP); NISSAN CHEMICAL INDUSTRIES, LTD., Tokyo (JP)

(72) Inventors: Shingo Tamesue, Wako (JP); Yasuhiro Ishida, Wako (JP); Masataka Ohtani, Wako (JP); Takuzo Aida, Wako (JP); Yoshihiro Kudo, Funabashi (JP); Taichi Nakazawa, Funabashi (JP)

(73) Assignees: RIKEN, Saitama (JP); NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/429,160

(22) PCT Filed: Sep. 18, 2013

(86) PCT No.: PCT/JP2013/075147
§ 371 (c)(1),
(2) Date: Mar. 18, 2015

(87) PCT Pub. No.: WO2014/046124
PCT Pub. Date: Mar. 27, 2014

(65) Prior Publication Data
US 2015/0225519 A1 Aug. 13, 2015

(30) Foreign Application Priority Data

Sep. 18, 2012 (JP) .................. 2012-205089

(51) Int. Cl.
*C07F 9/09* (2006.01)
*C08J 5/12* (2006.01)
*C09J 5/00* (2006.01)
*C09J 171/02* (2006.01)

(52) U.S. Cl.
CPC *C08J 5/127* (2013.01); *C09J 5/00* (2013.01); *C09J 171/02* (2013.01); *C08J 2333/08* (2013.01); *C08J 2333/24* (2013.01); *C08J 2471/02* (2013.01); *C09J 2471/00* (2013.01)

(58) Field of Classification Search
CPC .. C08J 5/127; C08J 2333/08; C08J 2333/24; C08J 2471/02
USPC ........................................................ 524/127
See application file for complete search history.

(56) References Cited

U.S. PATENT DOCUMENTS 3,890,974 A * 6/1975 Kozak .................. A61F 13/512
602/47
2001/0049413 A1 12/2001 Haraguchi

FOREIGN PATENT DOCUMENTS

| JP | H11-152426 A | 6/1999 |
| JP | 2002-053629 A | 2/2002 |
| JP | 2010-006855 A | 1/2010 |
| JP | 2011-001481 A | 1/2011 |
| JP | 2011001481 A * | 1/2011 |
| JP | 4704506 B2 | 6/2011 |
| JP | 2011-162648 A | 8/2011 |
| WO | 2011/001657 A1 | 1/2011 |

OTHER PUBLICATIONS

Translation of JP2011-001481, Jan. 6, 2011.*
Takeno et al., "Structural and Mechanical Properties of Composite Hydrogel Composed of Polymer and Nanoparticle," Polymer Preprints, 2012, vol. 61, No. 1, p. 683.
Takeno et al., "Structural and Mechanical Properties of Polyelectrolyte/Clay Composite Gels," Polymer Preprints, 2012, vol. 61, No. 2, pp. 4367-4368.
Saito et al., "Gel-Gel Adhesion by Double Network Structure," 17th Polymer Gen Symposium, Jan. 18, 2006, Japan, The Society of Polymer Science, pp. 29-30.
Tanagawa et al., "The Influence of Salt-Linkages on the Adhesion and Hardness Variance of Hydrogels," Bull. Chem. Soc. Jpn., 2002, vol. 75, No. 2, pp. 383-388.
Wang et al., "High-Water-Content Mouldable Hydrogels by Mixing Clay and a Dendritic Molecular Binder," Nature, Jan. 2010, vol. 463, pp. 339-343.
Dec. 10, 2013 International Search Report issued in International Patent Application No. PCT/JP2013/075147.
Dec. 10, 2013 Written Opinion issued in International Patent Application No. PCT/JP2013/075147.

* cited by examiner

*Primary Examiner* — Hui Chin
(74) *Attorney, Agent, or Firm* — Oliff PLC

(57) ABSTRACT

There is provided a method for bonding together hydrogels by interposing a polyalkylene glycol between the gel surfaces to be bonded together of hydrogels. A method for bonding together hydrogels of the same type or different types, the method including: interposing a polyalkylene glycol between gel surfaces to be bonded together of the hydrogels and joining together the gel surfaces.

12 Claims, 3 Drawing Sheets

METHOD FOR ADHERING HYDROGELS

TECHNICAL FIELD

The present invention relates to a method for bonding together hydrogels by interposing a polyalkylene glycol between the gel surfaces to be bonded together of hydrogels.

BACKGROUND ART

Hydrogels have been recently attracting attention from the viewpoint that hydrogels are soft materials having high biocompatibility because of containing water as the main component and having a low environmental load.

Water-soluble polymers such as polyacrylamide, polyacrylic acid, and polyvinyl alcohol are widely used as components of hydrogels. Among them, organic/inorganic composite hydrogels containing a polyacrylamide-based or cross-linked polyethylene glycol-based water-soluble polymer and a layered clay mineral allows successfully improving the strength of hydrogels, which has markedly expanded the range of their use (Patent Document 1 and Patent Document 2). Versatile organic/inorganic composite hydrogels have been recently disclosed that can be produced simply by mixing a polyelectrolyte, clay particles, and a dispersant (Non-Patent Document 1 and Non-Patent Document 2).

The use of hydrogels extend to an extremely wide range including medical use, quasi-drugs, cosmetics, daily necessities, food, electronic materials, agricultural materials, building materials, toys, sanitary materials, and biological bases, and hydrogels are used after being processed and formed in accordance with the respective uses. To process a self-supporting hydrogel, in addition to the production of a gel in a mold and extrusion molding, forming can be performed by removing unnecessary parts through cutting, punching, or the like. However, these pieces of work are extremely difficult or complicated for the production of hydrogels that require complicated shapes. In view of working efficiency, production by assembling fine components by bonding is simple. Bonding is extremely convenient also for the repair of broken parts such as cracks and ruptures in already completed hydrogel molded products. Thus, a method for bonding together hydrogels is being demanded.

As a method for bonding together hydrogels, a method is known in which surfaces to be bonded together are impregnated with a reactive monomer, the surfaces to be bonded together are brought into close contact and then subjected to a polymerization reaction, thereby a polymer network is formed (Non-Patent Document 3). Another method is known in which opposite ionic gels such as polyanions and polycations are bonded through electrostatic interaction (Non-Patent Document 4). Still another method is known in which, bonding of the same ionic gels is performed through opposite ionic fine particles (Patent Document 3). Recently disclosed are hydrogels that have self-repairability and allow bonding together even fresh surfaces that have just being cut (Patent Document 4 and Non-Patent Document 5).

PRIOR ART DOCUMENTS

Patent Documents

Patent Document 1: Japanese Patent Application Publication No. 2002-053629 (JP 2002-053629 A)
Patent Document 2: Japanese Patent No. 4704506 (JP 4704506 B2)
Patent Document 3: Japanese Patent Application Publication No. 2010-6855 (JP 2010-6855 A)
Patent Document 4: International Patent Application Publication No. 2011/001657 (WO 2011/001657)

Non-Patent Documents

Non-Patent Document 1: Preprints of the 61st Annual Meeting of the Society of Polymer Science of Japan, Vol. 61, No. 1, p. 683 (2012)
Non-Patent Document 2: Preprints of the 61st Symposium on Macromolecules, 1S11 (2012)
Non-Patent Document 3: Abstracts of the 17th Polymer Gel Symposium, p. 29 (2006)
Non-Patent Document 4: Bull. Chem. Soc., Jpn., 2002, 75, 383
Non-Patent Document 5: T. Aida, et al., Nature 463, 339 (2010)

SUMMARY OF THE INVENTION

Problems to be Solved by the Invention

However, the method disclosed in Non-Patent Document 3 is complicated and less versatile. In the method disclosed in Non-Patent Document 4, it is impossible to bond gels containing the same composition components because of electrostatic repulsion. The method of bonding disclosed in Patent Document 3 can be used only for gels having ionicity and cannot be used for bonding together gels formed of neutral polymers such as polyacrylamide and polyvinyl alcohol. The hydrogels disclosed in Patent Document 4 and Non-Patent Document 5 have the issues that only fresh surfaces that have just being cut can be bonded together and that the manufacturing cost is high because dendrimers as components of the hydrogels are manufactured through multi-step synthesis reactions.

In view of the above, there is a demand for a method for easily bonding together hydrogels.

The present invention has been achieved in view of the above circumstances, and an object thereof is to provide a method for bonding together hydrogels easily and by the use of low-priced raw materials.

Means for Solving the Problems

As a result of earnest study for resolving the above issues, the inventors of the present invention have found that when a polyalkylene glycol is interposed between hydrogel surfaces to be bonded together, and the gel surfaces to be bonded together are joined together, strong bonding between the hydrogels is achieved, and have achieved the present invention.

Specifically, the present invention relates to, as a first aspect, a method for bonding together hydrogels of the same type or different types, the method comprising: interposing a polyalkylene glycol between gel surfaces to be bonded together of the hydrogels and joining together the gel surfaces.

The present invention relates to, as a second aspect, the method for bonding together hydrogels according to the first aspect, in which the polyalkylene glycol is selected from the group consisting of polyethylene oxide, polypropylene oxide, and poly(ethylene oxide-co-propylene oxide) (ethylene oxide-propylene oxide copolymer).

The present invention relates to, as a third aspect, the method for bonding together hydrogels according to the second aspect, in which the polyalkylene glycol is a polyethylene oxide having a weight average molecular weight of 100,000 to 10,000,000.

The present invention relates to, as a fourth aspect, the method for bonding together hydrogels according to any one of the first to third aspects, in which the hydrogels are each a hydrogel comprising a water-soluble organic polymer (A) having an organic acid salt structure or an organic acid anion structure, a silicate salt (B), and a dispersant (C) for the silicate salt or a hydrogel comprising a water-soluble organic polymer (A') and the silicate salt (B).

The present invention relates to, as a fifth aspect, the method for bonding together hydrogels according to the fourth aspect, in which the water-soluble organic polymer (A) is a water-soluble organic polymer having a carboxylate salt structure or a carboxy anion structure.

The present invention relates to, as a sixth aspect, the method for bonding together hydrogels according to the fifth aspect, in which the water-soluble organic polymer (A) is a fully neutralized or partially neutralized polyacrylate salt.

The present invention relates to, as a seventh aspect, the method for bonding together hydrogels according to the sixth aspect, in which the water-soluble organic polymer (A) is a fully neutralized or partially neutralized polyacrylate salt having a weight average molecular weight of 1,000,000 to 10,000,000.

The present invention relates to, as an eighth aspect, the method for bonding together hydrogels according to the fourth aspect, in which the water-soluble organic polymer (A') is one or two or more compounds selected from the group consisting of polyacrylamide, cross-linked polyethylene glycol, and a poly(acrylamide-co-acrylate ester).

The present invention relates to, as a ninth aspect, the method for bonding together hydrogels according to the eighth aspect, in which the water-soluble organic polymer (A') is poly(N-isopropylacrylamide) or poly(N,N-dimethylacrylamide).

The present invention relates to, as a tenth aspect, the method for bonding together hydrogels according to the fourth aspect, in which the silicate salt (B) is a water-swellable silicate salt particle.

The present invention relates to, as an eleventh aspect, the method for bonding together hydrogels according to the tenth aspect, in which the silicate salt (B) is a water-swellable silicate salt particle selected from the group consisting of smectite, bentonite, vermiculite, and mica.

The present invention relates to, as a twelfth aspect, the method for bonding together hydrogels according to the fourth aspect, in which the dispersant (C) is a dispersant for a water-swellable silicate salt particle.

The present invention relates to, as a thirteenth aspect, the method for bonding together hydrogels according to the twelfth aspect, in which the dispersant (C) is one or two or more compounds selected from the group consisting of sodium orthophosphate, sodium pyrophosphate, sodium tripolyphosphate, sodium tetraphosphate, sodium hexametaphosphate, sodium polyphosphate, sodium poly(meth)acrylate, ammonium poly(meth)acrylate, poly(sodium acrylate-co-sodium maleate), poly(ammonium acrylate-co-ammonium maleate), sodium hydroxide, hydroxylamine, sodium carbonate, sodium silicate, polyethylene glycol, polypropylene glycol, sodium humate, and sodium ligninsulfonate.

Effects of the Invention

As described above, according to the present invention, it is possible to bond together hydrogels easily and firmly using industrially easily available raw materials. This can repair hydrogels having ruptures and cracks and bond together any parts, thus the present invention can be used as a new method for processing gels.

According to the present invention, it is possible to bond together hydrogels to be bonded together even if they are the same type or different types.

Although hydrogels are promising materials as soft materials having a low environment load, they had disadvantages that, for example, complicated processing of hydrogels is difficult and hydrogels are likely to be unusable due to breakage. The bonding method according to the present invention overcomes such disadvantages, and the effect of increasing the usefulness of the hydrogel is expected.

MODES FOR CARRYING OUT THE INVENTION

Figure 1:
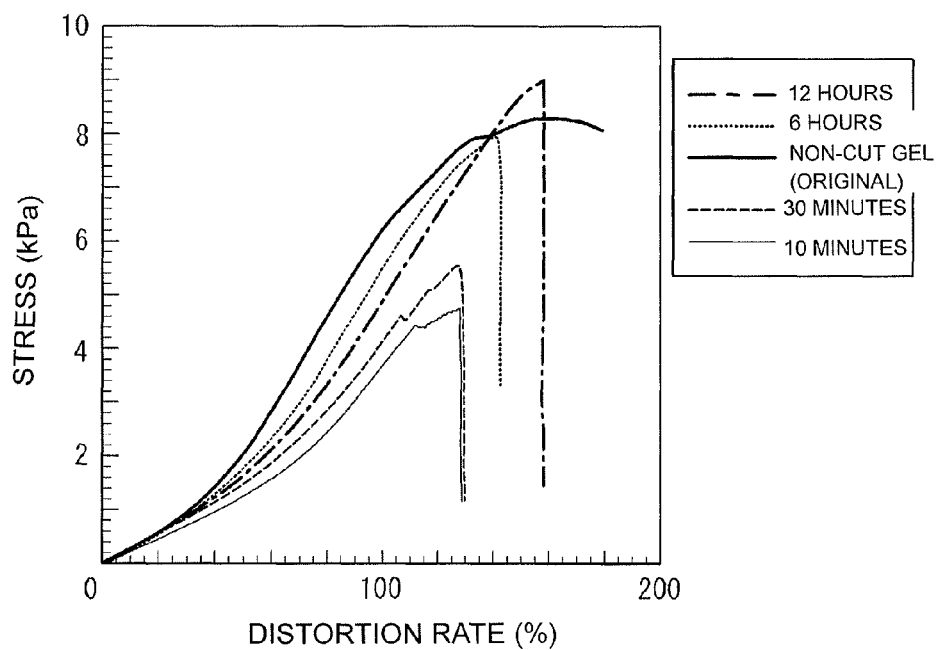
FIG. 1 is a diagram showing the tensile stress and the elongation rate of a bonded gel measured in Example 1.

The present invention relates to a method for bonding together hydrogels of the same type or different types, the method comprising interposing a polyalkylene glycol between hydrogel surfaces to be bonded together and joining together the hydrogel surfaces.

The method for bonding together hydrogels according to the present invention can be applied to, not only a case in which two or more hydrogels are bonded together, but also a case in which, in repairing cracks or broken parts in hydrogels, the cracks or broken parts are bonded together.

[Hydrogel]

The hydrogel to be bonded together by the method of bonding according to the present invention is preferably a hydrogel comprising a water-soluble organic polymer (A) having an organic acid salt structure or an organic acid anion structure, a silicate salt (B), and a dispersant (C) for the silicate salt or a hydrogel comprising a water-soluble organic polymer (A') and the silicate salt (B).

The hydrogel may contain, in addition to the above components, any other components as necessary to the extent that the intended effect of the hydrogel is not impaired.

<Component (A): Water-Soluble Organic Polymer Having Organic Acid Salt Structure or Organic Acid Anion Structure>

The component (A) is a water-soluble organic polymer having an organic acid salt structure or an organic acid anion structure.

Examples of the water-soluble organic polymer (A) having an organic acid salt structure or an organic acid anion structure include, as ones having a carboxy group, poly(meth)acrylate salts, salts of carboxyvinyl polymers, and salts of carboxymethyl cellulose; as one having a sulfonyl group, polystyrene sulfonate salts; and, as one having a phosphonyl group, polyvinyl phosphonate salts. Examples of the salts include sodium salts, ammonium salts, potassium salts, and lithium salts. The (meth)acrylic acid in the present invention refers to both acrylic acid and methacrylic acid.

The water-soluble organic polymer (A) may be cross-linked or copolymerized, and both fully neutralized products and partially neutralized products thereof can be used.

The weight average molecular weight of the water-soluble organic polymer (A) is, in terms of polyethylene glycol by gel permeation chromatography (GPC), preferably from 1,000,000 to 10,000,000, and the weight average molecular weight is more preferably from 2,000,000 to 7,000,000.

Water-soluble organic polymers available as commercial products have a weight average molecular weight labelled on the commercial products of preferably from 1,000,000 to 10,000,000, and the weight average molecular weight is more preferably from 2,000,000 to 7,000,000.

The water-soluble organic polymer (A) is preferably a water-soluble organic polymer compound having a carboxylate salt structure or a carboxy anion structure and is particularly preferably a fully neutralized or partially neutralized polyacrylate salt. Specifically, the water-soluble organic polymer (A) is preferably a fully neutralized or partially neutralized sodium polyacrylate and is particularly preferably a fully neutralized or partially neutralized non-cross-linked high polymerization degree sodium polyacrylate having a weight average molecular weight of from 2,000,000 to 7,000,000.

The content of the water-soluble organic polymer (A) is from 0.01% by mass to 20% by mass and preferably from 0.1% by mass to 10% by mass relative to 100% by mass of the hydrogel.

<Component (A'): Water-Soluble Organic Polymer>

The component (A') is a water-soluble organic polymer and may be cross-linked or copolymerized.

Examples of the water-soluble organic polymer (A') include polyacrylamide, cross-linked polyethylene glycol, and a poly(acrylamide-co-acrylate ester). One of these water-soluble organic polymers (A') may be used singly or two or more thereof may be used in combination.

Among them, the water-soluble organic polymer (A') is preferably polyacrylamide and particularly preferably poly(N-isopropylacrylamide) and poly(N,N-dimethylacrylamide).

The weight average molecular weight and the content of the water-soluble organic polymer (A') are as described in the above <Component (A): Water-Soluble Organic Polymer Having Organic Acid Salt Structure or Organic Acid Anion Structure>.

<Component (B): Silicate Salt>

The silicate salt (B) is preferably a water-swellable silicate salt particle. Examples of the silicate salt (B) include smectite, bentonite, vermiculite, and mica, which preferably form a colloid with water or a water-containing solvent as a dispersant. The smectite is a group name of montmorillonite, beidellite, nontronite, saponite, hectorite, stevensite, and the like. Examples of the shape of primary particles of the silicate salt particle include disc-like, plate-like, spherical, particulate, cubic, needle-like, rod-like, and amorphous. Disc-like or plate-like shape having a diameter of from 5 nm to 1,000 nm is preferable.

Preferable specific examples of the silicate salt (B) include a layered silicate salt; examples thereof easily available as commercial products include LAPONITE (registered trademark of Rockwood Additives Ltd.) XLG (synthetic hectorite), XLS (synthetic hectorite containing sodium pyrophosphate as a dispersant), XL21 (sodium magnesium fluorosilicate), RD (synthetic hectorite), RDS (synthetic hectorite containing an inorganic polyphosphate salt as a dispersant), and S482 (synthetic hectorite containing a dispersant) manufactured by Rockwood Additives Ltd.; LUCENTITE (registered trademark of Co-op Chemical Co., Ltd.) SWN (synthetic smectite) and SWF (synthetic smectite), micro mica (synthetic mica), and SOMASIF (registered trademark of Co-op Chemical Co., Ltd., synthetic mica) manufactured by Co-op Chemical Co., Ltd.; KUNIPIA (registered trademark of Kunimine Industries Co., Ltd., montmorillonite), SUMECTON (registered trademark of Kunimine Industries Co., Ltd.) SA (synthetic saponite) manufactured by Kunimine Industries Co., Ltd.; and BENGEL (registered trademark of Hojun Co., Ltd., a refined product of natural bentonite) manufactured by Hojun Co., Ltd.

The content of the silicate salt (B) is from 0.01% by mass to 20% by mass and preferably from 0.1% by mass to 15% by mass relative to 100% by mass of the hydrogel.

<Component (C): Dispersant for Silicate Salt>

The dispersant (C) for the silicate salt is preferably a dispersant for a water-swellable silicate salt particle.

Dispersants or peptizers used for the purpose of improving the dispersability of silicate salts and delaminating layered silicate salts can be used as the dispersant (C) for the silicate salt.

Examples of the dispersant (C) for the silicate salt include, as phosphate salt-based dispersants, sodium orthophosphate, sodium pyrophosphate, sodium tripolyphosphate, sodium tetraphosphate, sodium hexametaphosphate, and sodium polyphosphate; as polycarboxylate salt-based dispersants, sodium poly(meth)acrylate, ammonium poly(meth)acrylate, poly(sodium acrylate-co-sodium maleate), and poly(ammonium acrylate-co-ammonium maleate); as ones functioning as alkalis, sodium hydroxide and hydroxylamine; as ones forming insoluble salts or complex salts by the reaction with polyvalent cations, sodium carbonate and sodium silicate; and as other organic peptizers, polyethylene glycol, polypropylene glycol, sodium humate, and sodium ligninsulfonate.

Among them, preferable are the phosphate salt-based dispersants, the polycarboxylate salt-based dispersants, and the other organic peptizers. The polycarboxylate salt-based dispersants preferably have a weight average molecular weight of from 1,000 to 20,000.

Specifically, sodium pyrophosphate is preferable as one of the phosphate salt-based dispersants, a sodium polyacrylate or an ammonium polyacrylate having a weight average molecular weight of from 1,000 to 20,000 is preferable as one of the polycarboxylate salt-based dispersants, and a polyethylene glycol (PEG 900 or the like) having a weight average molecular weight of from 200 to 20,000 is preferable as one of the other organic peptizers.

It is known that a low polymerization degree sodium polyacrylate having a weight average molecular weight of from 1,000 to 20,000 functions as a dispersant by a mechanism including producing negative electric charges originated from carboxy anions on the surface of the particles through interactions with silicate salt particles and dispersing the silicate salt through the repulsion of the electric charges.

The content of the dispersant (C) is from 0.001% by mass to 20% by mass and preferably from 0.01% by mass to 10% by mass relative to 100% by mass of the hydrogel.

In producing the hydrogel containing the water-soluble organic polymer (A) having an organic acid salt structure or an organic acid anion structure, the silicate salt (B), and the dispersant (C) for the silicate salt, when a silicate salt containing a dispersant as the component (B) is used, the dispersant as the component (C) may be further added or may not be added.

The hydrogel may contain monohydric or polyhydric alcohols such as methanol, ethanol, and glycol, formamide, hydrazine, dimethyl sulfoxide, urea, acetamide, potassium acetate, and the like that are intercalated between layers of the layered silicate salt to promote delamination.

The hydrogel containing the water-soluble organic polymer (A) having an organic acid salt structure or an organic acid anion structure, the silicate salt (B), and the dispersant (C) for the silicate salt is preferably formed of a composition containing a silicate salt (a clay mineral), a water dispersant, and a polyacrylate salt. The hydrogel containing the water soluble organic polymer (A') and the silicate salt (B) is preferably formed of a composition containing a silicate salt (a clay mineral) and poly(N-isopropylacrylamide) or cross-linked polyethylene glycol.

A preferable combination of the water-soluble organic polymer (A), the silicate salt (B), and the dispersant (C) for the silicate salt is, relative to 100% by mass of the hydrogel, from 0.1% by mass to 10% by mass of a fully neutralized or partially neutralized non-cross-linked high polymerization degree sodium polyacrylate having a weight average molecular weight of from 2,000,000 to 7,000,000 as the component (A), from 0.1% by mass to 15% by mass of water-swellable smectite or saponite as the component (B), and from 0.01% by mass to 10% by mass of sodium pyrophosphate, from 0.01% by mass to 10% by mass of a polyacrylate salt having a weight average molecular weight of from 1,000 to 20,000, or from 0.01% by mass to 10% by mass of a polyethylene glycol having a weight average molecular weight of from 200 to 20,000 as the component (C).

A preferable combination of the water soluble organic polymer (A') and the silicate salt (B) is, relative to 100% by mass of the hydrogel, from 0.1% by mass to 10% by mass of poly(N-isopropylacrylamide) or poly(N,N-dimethylacrylamide) as the component (A) and from 0.1% by mass to 15% by mass of water-swellable smectite or saponite as the component (B).

<Component (D): Alcohol>

The hydrogel may contain an alcohol as a component (D). The alcohol may be a monohydric alcohol or may be a polyhydric alcohol.

The monohydric alcohol is preferably a water-soluble alcohol freely soluble in water and is more preferably a $C_{1-8}$ alcohol; specific examples thereof include methanol, ethanol, 2-propanol, i-butanol, pentanols, hexanols, 1-octanol, and iso-octanol.

The polyhydric alcohol is a dihydric or higher hydric alcohol; examples thereof include glycerin, polyglycerins (diglycerin, triglycerin, tetraglycerin, and the like), ethylene glycol, propylene glycol, a polyethylene glycol (PEG 600 or the like), polypropylene glycol, diethylene glycol, triethylene glycol, tetraethylene glycol, dipropylene glycols, 1,5-pentanediol (pentamethylene glycol), 1,2,6-hexanetriol, octylene glycol (ethohexadiol), butylene glycols (1,3-butylene glycol, 1,4-butylene glycol, 2,3-butanediol, and the like), hexylene glycols, 1,3-propanediol (trimethylene glycol), and 1,6-hexanediol (hexamethylene glycol).

Among these, preferable are glycerin, diglycerin, ethylene glycol, propylene glycol, polyethylene glycol, and polypropylene glycol, and glycerin is particularly preferable.

The content of the alcohol is from 0% by mass to 99% by mass and preferably from 0% by mass to 60% by mass relative to 100% by mass of the hydrogel.

<Method for Manufacturing Hydrogel>

The hydrogel containing the water-soluble organic polymer (A), the silicate salt (B), and the dispersant (C) for the silicate salt is obtained by gelation of a composition containing the component (A) to the component (C).

Specifically, the gelation can be performed by mixing a mixture of two components of the composition, an aqueous solution thereof, or an aqueous dispersion thereof and the residual one component, an aqueous solution thereof, or an aqueous dispersion thereof. The gelation can also be performed by adding water to a mixture of the components.

A method for mixing the components of the composition can be mechanical or manual stirring or ultrasonication, and among them, the mechanical stirring is preferable. The mechanical stirring can use magnetic stirrers, propeller type stirrers, planetary centrifugal mixers, dispersers, homogenizers, shakers, vortex mixers, ball mills, kneaders, line mixers, ultrasonic oscillators, or the like. Among them, mixing with planetary centrifugal mixers is preferable.

The temperature on mixing is from the freezing point to the boiling point of an aqueous solution or an aqueous dispersion, which is preferably from −5° C. to 100° C. and more preferably from 0° C. to 50° C.

Although the mixture is weak in strength and is sol-like immediately after mixing, it gelates after being allowed to stand still. The time during which it is allowed to stand still is preferably from 2 hours to 100 hours. The temperature at which it is allowed to stand still is from −5° C. to 100° C. and preferably from 0° C. to 50° C. By pouring the mixture into a mold or extrusion molding the mixture before gelation immediately after mixing, a gel having a desired shape can be produced.

The hydrogel containing the water-soluble organic polymer (A') and the silicate salt (B) can be produced by a method disclosed in Japanese Patent Application Publication No. 2002-53629 (JP 2002-53629 A) or the like.

[Polyalkylene Glycol]

The polyalkylene glycol used in the method for bonding together hydrogels according to the present invention is interposed between gel surfaces to be bonded together of hydrogels.

The polyalkylene glycol may be linear, branched, or copolymerized. Examples thereof include polyethylene oxide, polypropylene oxide, and poly(ethylene oxide-co-propylene oxide). Among them, in view of the bonding strength of hydrogels bonded together, the linear polyethylene oxide is preferable.

The weight average molecular weight of the polyalkylene glycol is, in terms of polyethylene glycol by gel permeation chromatography (GPC), from 100,000 to 10,000,000, and the weight average molecular weight is preferably from 500,000 to 10,000,000 and more preferably from 2,000,000 to 8,000,000.

Polyalkylene glycols available as commercial products have weight average molecular weights labelled on the commercial products of preferably from 500,000 to 10,000,000, and the weight average molecular weights are more preferably from 2,000,000 to 8,000,000.

A method for interposing a polyalkylene glycol between gel surfaces to be bonded together of hydrogels may be any method that can interpose a polyalkylene glycol between the gel surfaces to be bonded together; examples of the method include applying a polyalkylene glycol onto one or both of the gel surfaces, spraying a polyalkylene glycol onto one or both of the gel surfaces, and forming a polyalkylene glycol layer onto one or both of the gel surfaces. Among them, in view of the simplicity of operation, applying a polyalkylene glycol onto one or both of the gel surfaces is preferable.

In the method for bonding together hydrogels according to the present invention, the concentration of an aqueous solution of a polyalkylene glycol when the polyalkylene glycol is used in the form of an aqueous solution is preferably from 0.01% by mass to 50% by mass and more preferably from 0.1% by mass to 10% by mass.

[Method for Bonding together Hydrogels]

The method for bonding together hydrogels according to the present invention interposes a polyalkylene glycol between gel surfaces to be bonded together of hydrogels and joins together the gel surfaces to be bonded together and joining together the gel surfaces, thereby achieving bonding.

The gel surfaces to be bonded together of hydrogels are not limited to cut surfaces, fresh surfaces that have just being cut, or the like. The hydrogels used in the method for bonding together hydrogels according to the present invention may be the same type of hydrogels or may be different types of hydrogels as discussed above.

The method for bonding together hydrogels according to the present invention can be applied to, not only a case in which two or more hydrogels are bonded together, but also a case in which, in repairing cracks or broken parts in hydrogels, the cracks or broken parts are bonded together.

The amount of a polyalkylene glycol interposed between the gel surfaces to be bonded together of hydrogels is from 1 g/m$^2$ to 10 g/m$^2$ and preferably from 3 g/m$^2$ to 5 g/m$^2$.

The temperature when the hydrogels are joined together is from −5° C. to 100° C., preferably around 20° C., and specifically from 18° C. to 25° C.

The time during which the hydrogels are allowed to stand still after being joined together is preferably from 1 minute to 24 hours and more preferably from 10 minutes to 12 hours.

EXAMPLES

The present invention will be described more specifically below with reference to examples. The present invention is not limited to the following examples.

The hydrogels can be produced by the operations below, for example.

Manufacturing Example 1

Manufacture of Hydrogel (CNS/ASAP Gel) Formed of Silicate Salt (Clay Mineral), Aqueous Dispersion, and Polyacrylate Salt Ten parts of LAPONITE XLS (a dispersant-containing clay mineral manufactured by Rockwood Additives Ltd.) and 40 parts of water were mixed and stirred at 25° C. with a magnetic stirrer until a uniform aqueous dispersion was produced. Meanwhile, 1 part of a sodium polyacrylate having a degree of polymerization of from 22,000 to 70,000 (manufactured by Wako Pure Chemical Industries, Ltd., the viscosity of a 2 g/L aqueous solution at 30° C. is from 350 mPa·s to 560 mPa·s), and 49 parts of water were mixed and stirred at 25° C. with a magnetic stirrer until a uniform aqueous solution was produced.

These two liquids were mixed, were stirred at 25° C. at 2,000 rpm for 10 minutes with a planetary centrifugal mixer (ARE-310 manufactured by Thinky Corporation), and were then allowed to stand still for 3 days to obtain a hydrogel.

Manufacturing Example 2

Manufacture of Hydrogel (NC Gel) Formed of Silicate Salt (Clay Mineral) and Poly(N-isopropylacrylamide)

An NC gel was produced in accordance with an example disclosed in Patent Document 1 (Japanese Patent Application Publication No. 2002-053629 (JP 2002-053629 A)).

A clay mineral LAPONITE XLG (manufactured by Rockwood Additives Ltd.) for use in the production was vacuum dried at 100° C. for 2 hours. As an organic monomer, N-isopropylacrylamide (IPAA manufactured by Tokyo Chemical Industry Co., Ltd.) was refined by recrystallization with a toluene/hexane (a mass ratio of 1/10) mixed solvent. As a polymerization initiator, potassium peroxodisulfate (PPS manufactured by Kanto Chemical Co., Inc.) was mixed with a ratio of PPS/pure water=0.384/20 (g/g) to be an aqueous solution. As a catalyst, N,N,N',N'-tetramethylethylenediamine (TMEDA manufactured by Kanto Chemical Co., Inc.) was mixed with a ratio of TMEDA/pure water=160 µl/20 g to be an aqueous solution. By bubbling high-purity nitrogen gas through the pure water for 3 hours in advance to purge oxygen contained in the pure water.

In a nitrogen atmosphere, 0.662 g of LAPONITE XLG was added slowly to 16.96 g of the pure water at 20° C. with stirring to obtain a uniform aqueous dispersion. Two point zero grams of IPPA was added thereto, and the mixture was stirred for 5 minutes. One point zero six grams of the PPS aqueous solution and 2.0 g of the TMEDA aqueous solution were added thereto with stirring. The obtained mixed solution was allowed to stand still in a nitrogen atmosphere at 20° C. for 15 hours to cause a polymerization reaction, thereby obtaining a hydrogel.

Example 1

Measurement of Strength by Time after Bonding Together CNS/ASAP Gels

A 1% aqueous solution of a polyethylene oxide having a weight average molecular weight of 4,000,000 (4 M) (PEO manufactured by Sigma-Aldrich Corporation) was applied to each of the gel surfaces to be bonded together of two CNS/ASAP gel blocks (cut in dimensions of 7 mm×20 mm×17 mm) at 25° C. to bond them together. After lapses of 10 minutes, 30 minutes, 6 hours, and 12 hours from the bonding, the tensile rupture strength was measured. Shimadzu Compact Table-Top Universal Tester Ez-test/CE manufactured by Shimadzu Corporation was used for the measurement, and the measurement result is shown in FIG. 1. In comparison to a non-cut gel (original), although the tensile strength was about a half at lapses of 10 minutes and 30 minutes, nearly equal or higher strength was shown at a lapse of 6 hours and later.

Example 2

Figure 2:
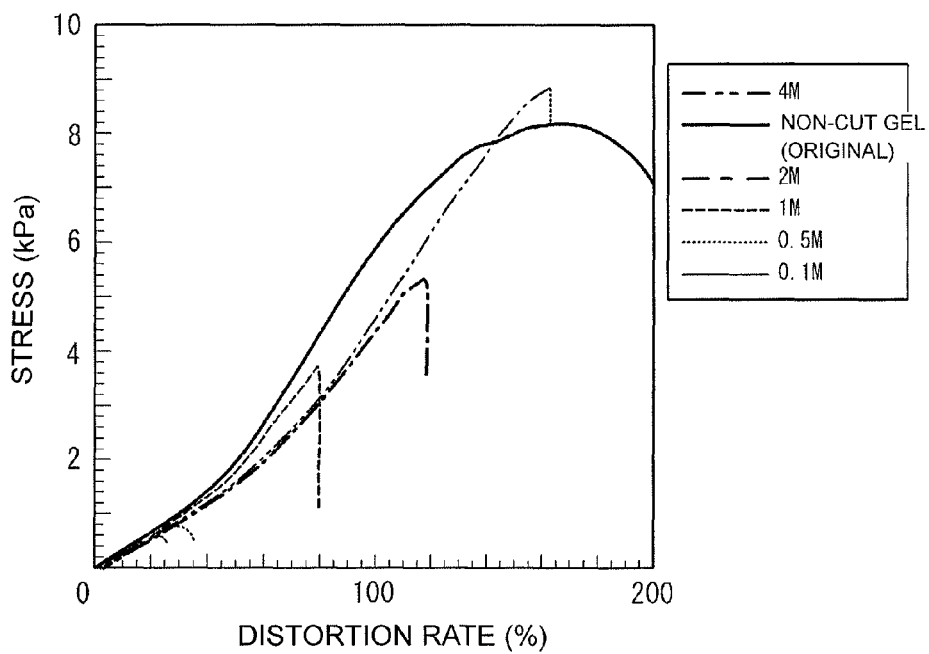
FIG. 2 is a diagram showing the tensile stress and the elongation rate of a bonded gel measured in Example 2.

Measurement of Strength by PEO Molecular Weight after Bonding Together CNS/ASAP Gels A 1% aqueous solution of a polyethylene oxide having a weight average molecular weight of 100,000 (0.1 M) (manufactured by Sigma-Aldrich Corporation) was applied to each of the gel surfaces to be bonded together of two CNS/ASAP gel blocks (cut in dimensions of 7 mm×20 mm×17 mm) at 25° C. to bond them together. The polyethylene oxide was changed to polyethylene oxides (manufactured by Sigma-Aldrich Corporation) having weight average molecular weights of 500,000, 1,000,000, 2,000,000, and 4,000,000 (0.5 M, 1 M, 2 M, and 4 M, respectively), and the same operation was performed for each of them. After the gel blocks were allowed to stand still for 12 hours after the bonding, the same measurement as Example 1 was performed. The measurement result is shown in FIG. 2. The result shows that a larger average molecular weight of PEO gives a higher tensile strength.

Example 3

Measurement of Strength after Bonding Together NC Gels

Figure 3:
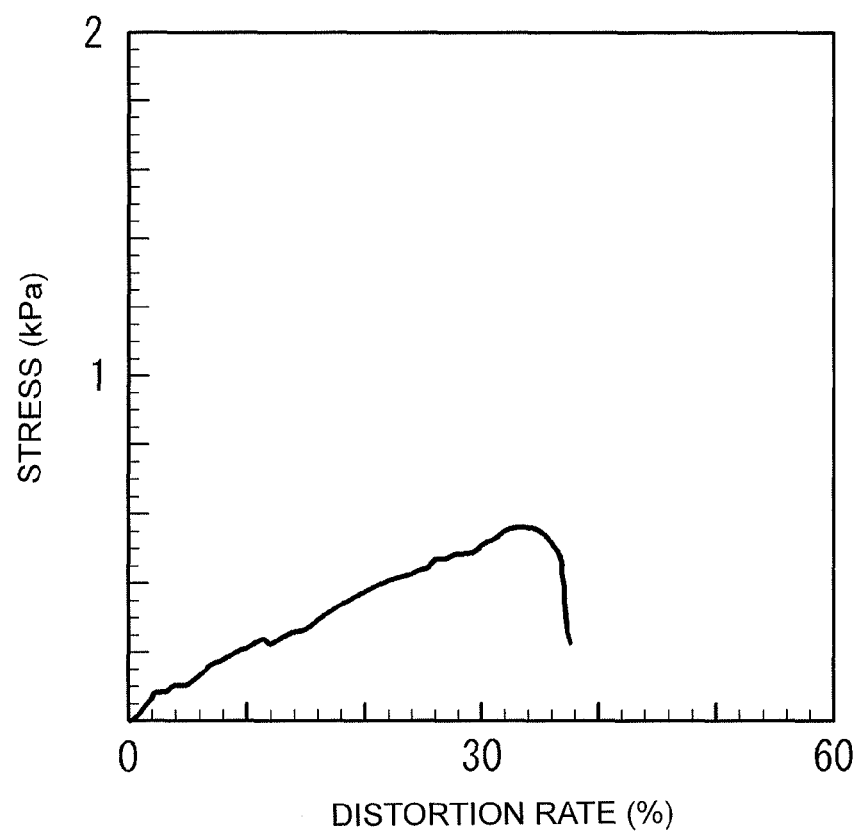
FIG. 3 is a diagram showing the tensile stress and the elongation rate of a bonded gel measured in Example 3.

A 1% aqueous solution of a polyethylene oxide having a weight average molecular weight of 4,000,000 (4 M) (PEO manufactured by Sigma-Aldrich Corporation) was applied to each of the gel surfaces to be bonded together of two NC gel blocks (cut in dimensions of 7 mm×20 mm×17 mm) at 25° C. to bond them together. After the gel blocks were allowed to stand still for 12 hours after the bonding, the same measurement as Example 1 was performed. The measurement result is shown in FIG. 3. Although bonding was demonstrated, its bonding power was lower than that of the CNS/ASAP gels. It is inferred that the bonding power of PEO originates from the interaction with the silicate salt (clay mineral) within the hydrogel, and it is suggested that there is correlation between the concentration of the silicate salt (the concentration of the clay mineral) and the bonding strength [the concentration of the silicate salt (the concentration of the clay mineral): CNS/ASAP gel=10%, NC gel=3%].

Example 4

Bonding Between NC Gel and CNS/ASAP Gel

Figure 4:
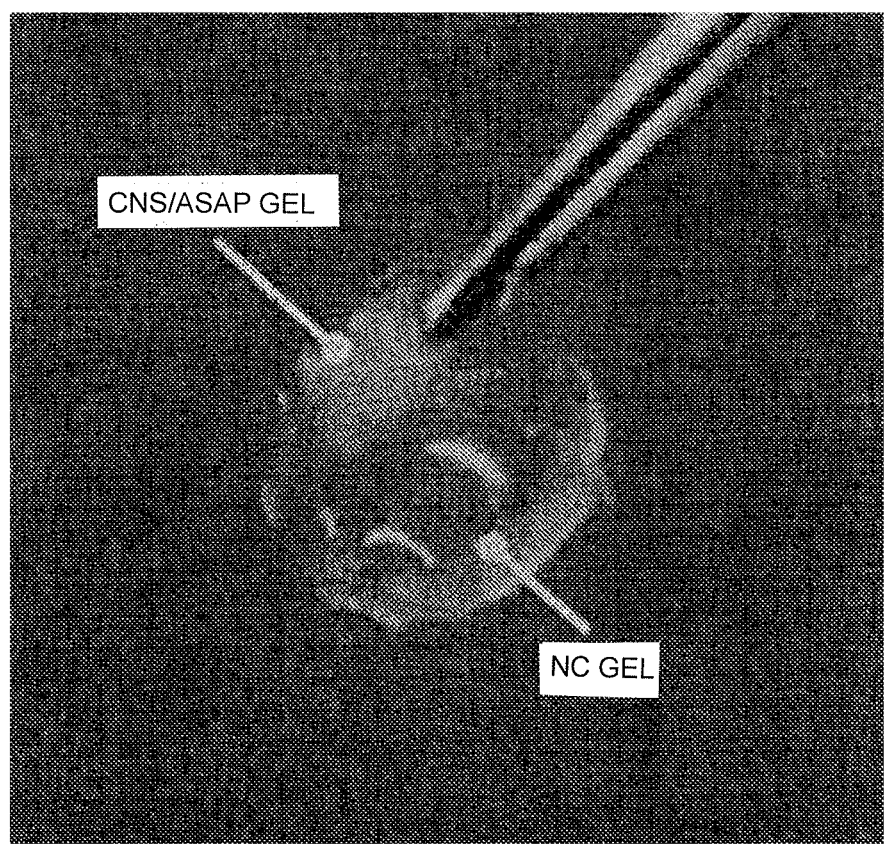
FIG. 4 is a photograph of hydrogels bonded together in Example 4.

A 1% aqueous solution of a polyethylene oxide having a weight average molecular weight of 4,000,000 (4 M) (PEO manufactured by Sigma-Aldrich Corporation) was applied to each of the gel surfaces to be bonded together of an NC gel and a CNS/ASAP gel at 25° C. to bond them together. A result after the gel surfaces were allowed to stand still for 12 hours after the bonding is shown in FIG. 4.

INDUSTRIAL APPLICABILITY

According to the present invention, it is possible to bond together hydrogels easily using industrially easily available raw materials. This allows repairing hydrogel products having ruptures and cracks and bonding together any parts, thus enabling formation by assembly. Accordingly, the present invention can be used as a new method for processing gels. Although hydrogels are promising materials as soft materials having a low environment load, they had disadvantages that, for example, complicated processing of hydrogels is difficult and hydrogels are likely to be unusable due to breakage. The bonding method according to the present invention overcomes such disadvantages, and the effect of increasing the usefulness of the hydrogel is expected.

The invention claimed is:
1. A method for bonding together same or different hydrogels, the method comprising:
interposing a polyethylene oxide between gel surfaces to be bonded together of the hydrogels and joining together the gel surfaces, wherein
the polyethylene oxide has a weight average molecular weight of 100,000 to 10,000,000.

2. The method for bonding together hydrogels according to claim 1, wherein
the hydrogels are each (i) a hydrogel comprising a water-soluble organic polymer (A) having an organic acid salt structure or an organic acid anion structure, a silicate salt, and a dispersant for the silicate salt, or (ii) a hydrogel comprising a water-soluble organic polymer (A'), which is different from the water-soluble organic polymer (A), and the silicate salt.

3. The method for bonding together hydrogels according to claim 2, wherein
the water-soluble organic polymer (A) is a water-soluble organic polymer having a carboxylate salt structure or a carboxy anion structure.

4. The method for bonding together hydrogels according to claim 3, wherein
the water-soluble organic polymer (A) is a fully neutralized or partially neutralized polyacrylate salt.

5. The method for bonding together hydrogels according to claim 4, wherein
the water-soluble organic polymer (A) is a fully neutralized or partially neutralized polyacrylate salt having a weight average molecular weight of 1,000,000 to 10,000,000.

6. The method for bonding together hydrogels according to claim 2, wherein
the water-soluble organic polymer (A') is one or two or more compounds selected from the group consisting of polyacrylamide, cross-linked polyethylene glycol, and a poly(acrylamide-co-acrylate ester).

7. The method for bonding together hydrogels according to claim 6, wherein
the water-soluble organic polymer (A') is poly(N-isopropylacrylamide) or poly(N,N-dimethylacrylamide).

8. The method for bonding together hydrogels according to claim 2, wherein
the silicate salt is a water-swellable silicate salt particle.

9. The method for bonding together hydrogels according to claim 8, wherein
the silicate salt is a water-swellable silicate salt particle selected from the group consisting of smectite, bentonite, vermiculite, and mica.

10. The method for bonding together hydrogels according to claim 2, wherein
the dispersant is a dispersant for a water-swellable silicate salt particle.

11. The method for bonding together hydrogels according to claim 10, wherein
the dispersant is one or two or more compounds selected from the group consisting of sodium orthophosphate, sodium pyrophosphate, sodium tripolyphosphate, sodium tetraphosphate, sodium hexametaphosphate, sodium polyphosphate, sodium poly(meth)acryl ate, ammonium poly(meth)acrylate, poly(sodium acrylate-co-sodium maleate), poly(ammonium acrylate-co-ammonium maleate), sodium hydroxide, hydroxylamine, sodium carbonate, sodium silicate, polyethylene glycol, polypropylene glycol, sodium humate, and sodium ligninsulfonate.

12. The method for bonding together hydrogels according to claim 1, wherein the polyethylene oxide is a linear polyethylene oxide.

* * * * *